US006779776B2

(12) United States Patent
Suilmann et al.

(10) Patent No.: US 6,779,776 B2
(45) Date of Patent: Aug. 24, 2004

(54) INTRINSICALLY SAFE ELECTRICALLY MAGNETICALLY OPERATED HYDRAULIC VALVE

(75) Inventors: Franz-Heinrich Suilmann, Laer (DE); Michael Dettmers, Kamen (DE); Jens Titschert, Lunen (DE); Hans-Udo Rheiner, Menden (DE)

(73) Assignee: DBT GmbH, Lunen (DE)

( * ) Notice: Subject to any disclaimer, the term of this patent is extended or adjusted under 35 U.S.C. 154(b) by 0 days.

(21) Appl. No.: 10/375,316

(22) Filed: Feb. 26, 2003

(65) Prior Publication Data

US 2003/0160200 A1 Aug. 28, 2003

(30) Foreign Application Priority Data

Feb. 27, 2002 (DE) ........................................ 202 03 094

(51) Int. Cl.[7] ................................................ F16K 31/02
(52) U.S. Cl. .............................. 251/129.18; 251/129.15
(58) Field of Search ........................ 251/129.01–129.22

(56) References Cited

U.S. PATENT DOCUMENTS 5,467,963 A * 11/1995 Crofts et al. ........... 251/129.18
5,875,922 A * 3/1999 Chastine ................ 251/129.15
6,224,348 B1 * 5/2001 Fukanuma et al. .... 251/129.13
6,405,743 B1 * 6/2002 Spryshak et al. ...... 251/129.15
2001/0011559 A1 8/2001 Rheiner

FOREIGN PATENT DOCUMENTS

DE 3917 528 A1 12/1990

* cited by examiner

*Primary Examiner*—Paul J. Hirsch
(74) *Attorney, Agent, or Firm*—Cook, Alex, McFarron, Manzo, Cummings & Mehler, Ltd.

(57) ABSTRACT

A solenoid operated hydraulic valve for electro-hydraulic controlled underground mining installations such as advancing support frame controllers, with an actuator housing holding coil bodies, an armature, a magnetizable core, and an operating pin of at least two solenoids. The head end for the operating pins of each solenoid has a cut-out for an operating stroke adjuster. A head plate removable from the actuator housing is provided with a manual operating device for each operating pin and is fastened to the head end of the actuator housing with a head seal between them, a removable valve block accepting the hydraulic multi-way valves and an interposed base seal fastened to the actuator housing base. A housing having a socket connects to an intrinsically safe current supply and accepts the operating electronics for the solenoids, and is located on the side of the actuator housing. In each head end cut-out, an electronic protective circuit for the associated coil body is arranged.

12 Claims, 1 Drawing Sheet

INTRINSICALLY SAFE ELECTRICALLY MAGNETICALLY OPERATED HYDRAULIC VALVE

Figure 2:
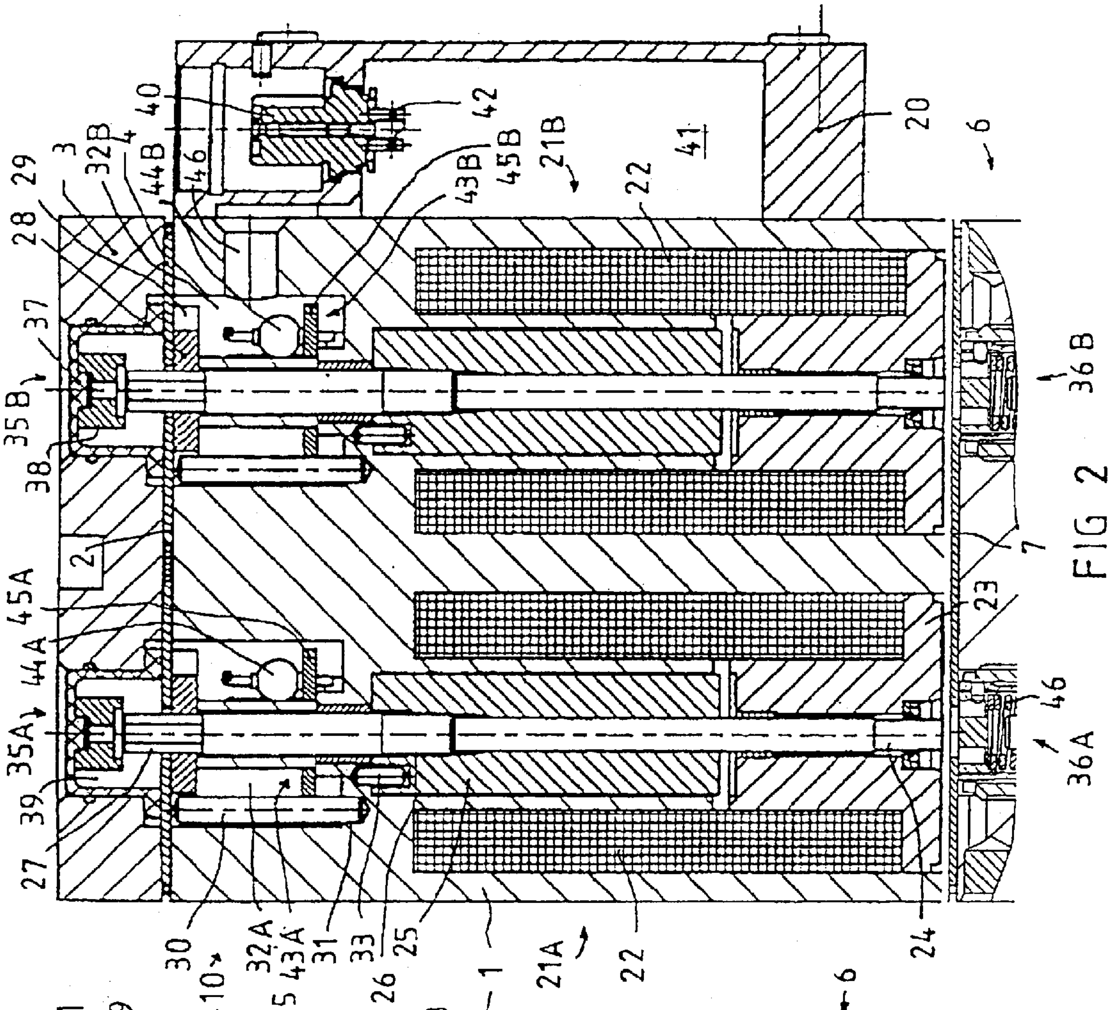

The invention relates to an intrinsically safe electrically magnetically operated hydraulic valve for electro-hydraulically controlled underground mining installations such as especially advancing support frame controllers, with an actuator housing, which accepts the coil bodies, the armature, the magnetisable core, and the operating pins of at least two electro magnets and on the head end for the operating pins of each electro magnet has a cut out for the arrangement of an operating stroke adjuster, with a head plate which can be removed from the actuator casing, which is provided with a manual operating device for each operating pin and is fastened to the head end of the actuator housing with a head seal inserted between them, with a valve block which can be removed from the actuator housing, which accepts the hydraulic multi-way valves and with the interposition of a base seal is fastened to the base of the actuator housing, and with an electronics housing which has a connector socket for connection to an intrinsically safe current supply and which accepts the operating electronics for the electro magnets, which is fastened on the side of the actuator housing.

A previously proposed electrically magnetically operated hydraulic valve with an adjusting device in a head end cut out is described in DE-U-20104677 of the assignee. The adjusting device is accessible and user friendly when the head cover is removed and facilitates the sensitive adjustment of the operating pin. In the head cover are integrated manual operation devices for operating the electro magnets or multi-way control valves in emergency situations. In internal trials of this hydraulic valve it has been shown that the clearly structured assembly of this valve based on the arrangement of the parts of the electro magnets in the actuator housing, the hydraulic parts in a separate valve block and the functional parts for manual operation, as for example protective sleeves of elastic material in the head cover is especially favourable for maintenance purposes. A dust and moisture tight seal is obtained by comparatively large surfaced head and base seals and these seals are themselves simply exchangeable. The base seal effects a complete separation between the electrical side and the hydraulic side of the electrically magnetically operated hydraulic valve and forms a further improvement in electrically hydraulically operating devices as opposed to the known hydraulic valves.

Since the electrically magnetically operated hydraulic valves are destined for underground application, they must comply with all the construction and test conditions for fire-damp and explosion protection and especially must satisfy the intrinsic safety spark protection class. In the commercially available intrinsically safe electrically magnetically operated hydraulic valve of DE-A-4140233, which has neither a cut out at the head end nor an integrated lift adjuster, the intrinsically safe operating electronics is encapsulated within the electronics housing by means of a cast mass and the electronics case is fastened to the actuator housing by means of a screw connection, which is cast in with the cast mass. Exchange of the intrinsically safe operating electronics is in this hydraulic valve not provided since the exchange would lead to a loss of the intrinsic safety spark protection Classification.

It is the aim of the present invention to produce an improved, maintenance and operationally friendly intrinsically safe electrically magnetically operated hydraulic valve for underground applications.

Accordingly the present invention is directed to an intrinsically safe electrically magnetically operated hydraulic valve as described in the opening paragraph of the present specification, in which each head end cut out an electronic protective circuit for the associated coil bodies is arranged. Owing to the integration of an appropriate electronic protection circuit for each coil body in the actuator housing, the requirement is also satisfied that the electronics case with the operating electronics can be disassembled and exchanged without the test conditions for the spark protection intrinsic safety being impaired. Advantageously the actuator housing, the head plate, the electronics case and the valve block are separable in a modular fashion from each other and can be replaced. The encapsulation or casting of the fastening means for the electrics case is no longer necessary.

In a preferred embodiment the electronic protective circuit comprises at least one freewheeling diode. In an electromagnet connected to a direct current supply, on breaking the current, short term voltage peaks arise, owing to the large voltages induced by the breakdown of the magnetic field, whose polarity is reversed to the direct voltage applied to the coil body. Using a freewheeling diode, which takes on the load current as soon as its voltage becomes positive the energy in the magnetic field can be broken down. With a protective circuit employing a freewheeling diode insulation damage to the coil windings of the coil bodies and other problems brought about by the voltage peaks can be avoided, whereby the intrinsic safety of the magnetic valve itself remains provided even with an exchange of the operating electronics because of the integrated protection circuits in the actuator housing. Instead of the freewheeling diodes other suitable electronic components as for instance varistors can be provided in the protective circuit, although the use of freewheeling diodes forms the preferred embodiment. Advantageously protective circuit and the freewheeling diode are components of a circuit board arranged in the cut out, which preferably forms an electronics insert, positioned in the cut out by simple means and anchored there so as to be fixed against vibration.

In a preferred embodiment of the intrinsically safe electrically magnetically operated hydraulic valve foresees an adjustment device which comprises an adjustment disk positively engaging on the operating pin, which can be retained in its adjusted position by a means of retaining pin which can be retained in the actuator housing passing through a cut out in the edge zone of the adjusting disk, as is described in detail in DE-U-20104677, to which on this subject express reference is made and whose content is imported by reference into the present application.

To optimise the sealing function of the head seal and/or the base seal, both advantageously comprise sealing plates with shoulder like or lip like swellings. These swellings can not only improve the sealing function to the bordering surface between the housing parts when brought together but since they are pressed together in the assembled condition they also store a separating force which eases the separation of the two. Preferably the head seal and the base seal have an identical or mirror image profile of each other so that the construction prevents the maintenance personnel from using an incorrect sealing plate or positioning the sealing plate the wrong way around.

In preferred embodiment the operating electronics in the electronic casing have a circuit for reducing the maintaining current in the feed of the electro magnetics from an intrinsically safe DC supply. Advantageously the actuator housing comprises a ferro-magnetic material in order to obtain an increase of magnetic force for the same coil current owing to the additional ferro-magnetic mass and thus to be able to reduce the operating current. It is then preferable to provide the actuator housing with a coating which comprises plastics material such as especially a duroplast or a suitable polymer, in order to protect the actuator housing from external influences due to moisture and to prevent corrosion arising on the ferro-magnetic parts. Advantageously for the positioning of the valve block and/or the head plate on the actuator housing at least one centering pin is provided. For the modular construction and easy exchange of one of the housings, preferably the screwing together of the valve block with the actuator housing and the screwing together of the head plate with the actuator housing can be loosened independently of each other.

Figure 1:
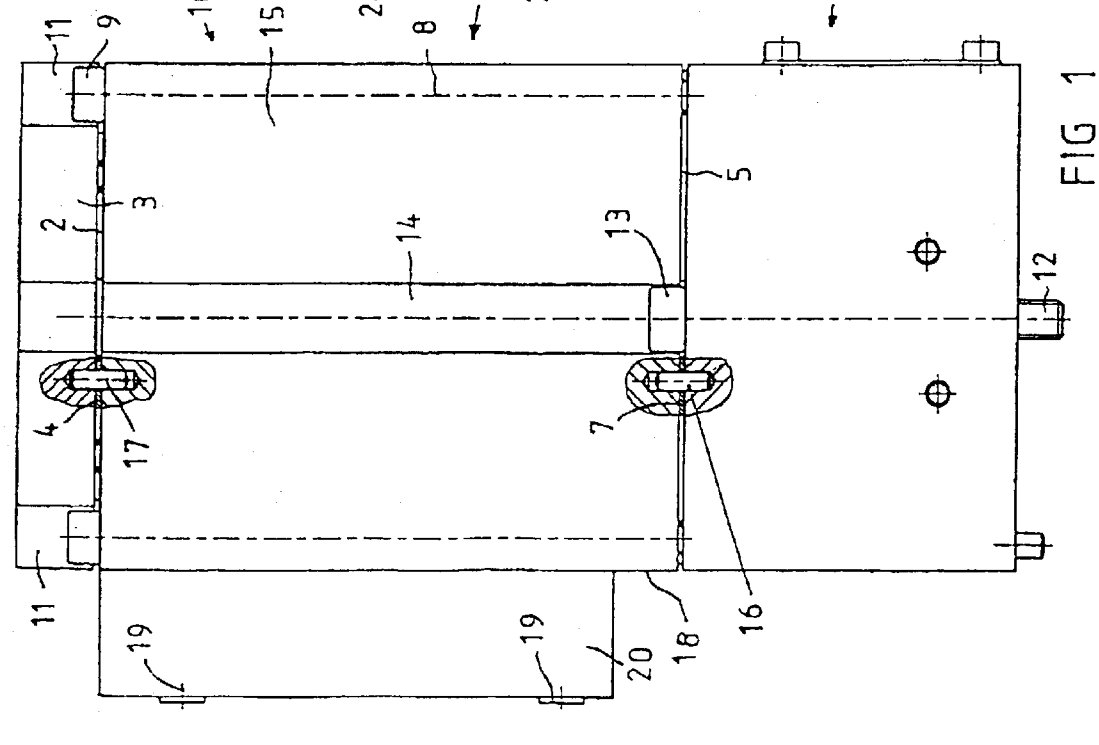

An electrically magnetically operated hydraulic valve made in accordance with the present invention will now be described herein below in relation to the accompanying drawing, in which:

FIG. 1 shows a side view of an electrically magnetically operated hydraulic valve according to the present invention; and FIG. 2 shows a longitudinal section through the hydraulic valve shown in FIG. 1.

In FIG. 1 and FIG. 2 show an electrically magnetically operated hydraulic valve 10, which preferably is applied in a not further illustrated advancing support frame controller for the control of the hydraulic prop and the movement cylinders in underground advancing support frames. The hydraulic valve 10 is constructed from modular housing parts which are separable from each other and comprises a central actuator case 1 on whose head end 2 a head plate 3 with the interposition of a head seal 4 and on whose base 5 a valve block 6 with the interposition of a base seal 7 are flanged on in a dust and moisture tight manner. the valve block 6 is fastened to the actuator housing 1 using a crew connection 8 which engages through the actuator housing 1 and whose screw heads 9 lie exposed in open edge corner cut outs 11 of the head plate 3. The screw 8 between the actuating housing 1 and the valve block 6 can therefore be loosened even with the head plate 3 assembled. The head plate 3 is fastened using further not shown screws immediately onto the actuator housing 1. The valve block 6 is again fastened to a connecting rail provided with hydraulic connectors on the advancing support frame, by means of fastening screws 12, whose screw heads 13 lie exposed in edge grooves 14 in the long sides 15 of the valve block 1, and are accessible from the head end 2 of the valve block 1 and the head plate 3. To Centre the valve block to the actuator case 1 at least one centering pin 16 and to centre the head plate 3 on the actuator case 1 at least one centering pin 17 is provided.

An electronics case 20 is screwed onto one of the two cross sides 18 of the actuator housing 1 by means of several screws 19. The type of screw fixing is chosen such that the head plate 3, the actuator housing 1, the electronic case 20 or the valve block 6 can be removed from the hydraulic valve 10 without having to disassemble the other housings.

Reference is now made to FIG. 2. From the sectional view it can be seen that the hydraulic valve 10 is constructed as a double valve and has in the square shaped actuator housing 1 two identically constructed separately controllable electro magnets 21A, 21B, which are arranged on parallel axes alongside each other. Each electro magnet 21A, 21B comprises a coil body 22, an iron core 23, an operating pin 24 completely passing through the actuator housing 1 and an armature 25 into which the operating pin 24 is screwed in by means of a fine thread section 26. The fine thread section 26 between the operating pin 24 and the armature 25 permits an adjustment of the operating lift of the electro magnets 21A, 21B with the head plate 3 demounted. The adjustment of the lifting stroke is hereby, as explained in detail in DE-U-20104677, effected by a relative rotation between the armature 25 and the operating pin 24. To change the operating stroke the head end operating pin end 27 of the operating pin 24 has a suitable multiple edged outer profile, onto which with a positive engagement an adjusting disk 28 is fitted. The armature 25 of each electro magnetic 21A, 21B is secured against any rotation by a anti-twist device for example constructed from a anti-twist pin 33 but can however move axially. To retain the adjusted operating stroke the adjusting disk 28 is provided with cut outs 29 in its edge zone, which form indexing elements. After setting the adjustment position, a retaining pin 30 engages through one of these cut outs 29. The adjusting disk 28 and the centering pin 30 with which the operating stroke adjustment is achieved are accepted in a blind hole type of cylindrical cut out 32A or 32B on the head end 2 of the actuator housing 1 which form a head end hollow space in the actuator housing 1. The centering pin 30 engages in the retaining position in a boring 31 in the base of the cut out 32A or 32B. The operating lift adjusting device is protected in the actuator housing 1 and access is provided exclusively with the head plate 3 demounted.

Further to this on the operating pin ends 27 of both electro magnets 21A, 21B hand operating devices 35A, 35B are arranged so as in an emergency situation the associated multi-way valves 36A, 36B in the valve block 6 with the electro magnets 21A, 21B and not further illustrated but known in their construction can be operated by hand. The hand operating devices 35A, 35B comprise sleeves 37 of an elastic material which are set into suitable cut outs 39 in the head plate 3 and retain a push button 38 in a position in front of the operating pin ends 27. Sealing of the head end cut out 32A, 32B against dust and moisture is affected using the sleeves 37 and the head seal 4.

As FIG. 2 shows further, in the electronics case 20 a socket 40 is fastened via which both electro magnets 21A, 21B can be connected to a DC supply. Operating electronics, not shown, are connected to the contact pins 42 of the socket 40 in the interior 41 of the electronic box 20 with which in the operated condition of the electro magnets 21A, 21B i.e. with the armature 25 and the operating pin 24 pushed out axially from the starting position shown, a retaining current reduction can be realised in the coil bodies 22 of the electro magnetics 21A, 21B through which current flows. The operating electronics is connected via cable connectors, not shown and removable, led in through the cable entry 46 into the actuator housing 1, with protective circuits 43A, 43B for the coil bodies 22 of the electro magnetics 21A, 21B. The protective circuit 43A is connected via cables, not shown, to the coil body 22 of the electro magnets 21A and the protective circuit 43B is connected via cables, not shown, to the coil body 22 of the electro magnets 21B. Both protective circuits 43A, 43B are constructed as a circuit board 45A, 45B with a freewheeling diode 44A, 44B and a suitable circuit. Since the protective circuits 43A, 43B are integrated into the actuator housing 1 the electronics case 20 can also be exchanged or renewed including the electronic circuit arranged within it, without the test conditions for the intrinsic safety spark protection classification of being infringed.

The protection circuits 43A, 43B are integrated in the hollow spaces formed by the cut outs 32A, 32B and protected against dust and moisture by the head seal 4 and the sealing effected by the sleeves 37. Both protective circuits

43A, 43B assure that with the switching off of one of the electro magnetics 21A, 21B the load current of the associated coil body 22 flows via the freewheeling diode 44A, 44B and voltage peaks cannot arise.

The possibility of separating the head plate 3 and the valve block 6 from the actuator housing 1 is made easier in that the head seal 4 and the base seal 7 each have shoulder like swellings (not shown), which after the loosening of the associated screwed connections (e.g. 8 between the actuator housing 1 and the valve block 6) the separating force stored by screwing up can be released.

As mentioned earlier above, FIG. 2 shows both electro magnets 21A, 21B in the starting position, i.e. with the current switched off. By switching on one of the electro magnets 21A, 21B the direct current is taken to the associated coil body 22 so that in the coil body 22 a magnetic field is built up which pulls the armature 25 against the iron core 23 and effects a pushing out movement of the operating pin 24. The operating pin moves the valve body of the multi-way valve 36A, 36B sitting in the valve block 6, against the return force of a spring 46. On reaching the operating position the pulling on current in the coil body 22 can be reduced making use of the force of remanence, without the switched position of the electro magnetics 21A or 21B being changed. It is favourable here if the actuator housing 1 comprises a ferro-magnetic material, so as overall to reduce the current consumption required for operating an electro magnet 21A or 21B. In the embodiment with a ferro-magnetic actuator housing 1 this is provided with a coating of plastics material or similar, not shown.

For a man skilled in the art several modifications are evident from the previous description, which will fall under the area of protection. The protective circuit for the electro magnets can also be realised other than with freewheeling diodes. The protection against turning of the armature can instead of a securing pin also comprise positive engagement means in the armature and in the actuator housing. The operating electronics in the electronics housing can be encapsulated with a cast mass. Such and other modifications should fall in the scope of the attached claims.

What is claimed is:

1. An intrinsically safe electrically magnetically operated hydraulic valve for electra-hydraulic controlled underground mining installations and including advancing support frame controllers with an actuator housing, which accepts coil bodies, an armature, a magnetisable core, and an operating pin of at least two electro magnets, and the head end for the operating pins of each electro magnet having a cut out for the arrangement of an operating stroke adjuster, with a head plate, which can be removed from the actuator housing, which is provided with a manual operating device for each operating pin and is fastened to the head end of the actuator housing with a head seal inserted between them, with a valve block which can be removed from the actuator housing, which accepts hydraulic multi-way valves and with the interposition of a base seal which can be fastened to the base of the actuator housing, and with an electronics housing which has a socket for connection to an intrinsically safe current supply and which accepts the operating electronics for the electro magnets, which is fastened on the side of the actuator housing, in which in each head end cut out is an electronic protective circuit for the arrangement of the associated coil body.

2. An electrically magnetically operated hydraulic valve according to claim 1, in which the actuator housing, the head plate, the electronics case and the valve block are separable in a modular fashion from each other and can be replaced.

3. An electrically magnetically operated hydraulic valve according to claim 1, in which the protective circuit comprises at least one freewheeling diode.

4. An electrically magnetically operated hydraulic valve according to claim 3, in which the protective circuit and the freewheeling diodes are components of a circuit board in the cut out, which forms an electronics insert.

5. An electrically magnetically operated hydraulic valve according to claim 1, in which, the operating stroke adjuster comprises an adjustment disk positively engaging on the operating pin, which can be retained in its adjusted position by means of a retaining pin which can be retained in the actuator housing passing through a cut out in the edge zone of the adjusting disk.

6. An electrically magnetically operated hydraulic valve according to claim 1, in which the head seal and/or the base seal comprise sealing plates with shoulder like or lip like swellings.

7. An electrically magnetically operated hydraulic valve according to claim 6, in which the head seal and the base seal have an identical or mirror image profile of each other.

8. An electrically magnetically operated hydraulic valve according to claim 1, in which the operating electronics arranged in the electronics case have a circuit for reducing the current.

9. An electrically magnetically operated hydraulic valve according claim 1, in which the actuator housing comprises a ferro-magnetic material.

10. An electrically magnetically operated hydraulic valve according to claim 9, in which the actuator housing is provided with a coating which comprises a plastics material such as a duroplast or a suitable polymer.

11. An electrically magnetically operated hydraulic valve according to claim 1, in which for the positioning of the valve block on the actuator housing and/or the head plate on the actuator housing at least one centering pin is provided.

12. An electrically magnetically operated hydraulic valve according to claim 1, in which the screwing together of the valve block with the actuator housing and the screwing together of the head plate with the actuator housing can be loosened independently of each other.

* * * * *